(12) United States Patent
Jiang et al.

(10) Patent No.: US 6,992,039 B2
(45) Date of Patent: Jan. 31, 2006

(54) METHOD FOR MAKING MONODISPERSED NOBLE METAL NANOPARTICLES SUPPORTED ON OXIDE SUBSTRATES

(75) Inventors: Long Jiang, Beijing (CN); Jinru Li, Beijing (CN); Mei Cai, Bloomfield Hills, MI (US); Jerry Dale Rogers, Rochester Hills, MI (US)

(73) Assignees: General Motors Corporation, Detroit, MI (US); Chinese Academy of Sciences, Beijing (CN)

(*) Notice: Subject to any disclaimer, the term of this patent is extended or adjusted under 35 U.S.C. 154(b) by 202 days.

(21) Appl. No.: 10/388,241

(22) Filed: Mar. 13, 2003

(65) Prior Publication Data

US 2004/0180785 A1    Sep. 16, 2004

(51) Int. Cl.
*B01J 21/08* (2006.01)
*B01J 21/12* (2006.01)
*B01J 21/14* (2006.01)
*B01J 23/00* (2006.01)
*B01J 20/00* (2006.01)

(52) U.S. Cl. .................. 502/327; 502/243; 502/244; 502/258; 502/259; 502/260; 502/261; 502/262; 502/325; 502/326; 502/330; 502/331; 502/332; 502/333; 502/334; 502/335; 502/337; 502/339; 502/344; 502/345; 502/346; 502/347; 502/348; 502/355; 502/415; 502/439

(58) Field of Classification Search ............... 502/243, 502/258–262, 325–327, 330–335, 337, 339, 502/344–348, 355, 415, 439, 244
See application file for complete search history.

(56) References Cited

U.S. PATENT DOCUMENTS

| | | | |
|---|---|---|---|
| 4,008,182 A * | 2/1977 | Haensel et al. ............ 502/334 |
| 4,283,308 A * | 8/1981 | Ohara et al. ............... 502/213 |
| 4,714,692 A * | 12/1987 | Abrevaya et al. .......... 502/261 |
| 4,714,693 A * | 12/1987 | Targos ....................... 502/261 |
| 5,208,202 A * | 5/1993 | Muramatsu et al. ....... 502/302 |
| 5,627,125 A * | 5/1997 | Ebner et al. ............... 502/331 |
| 5,814,370 A | 9/1998 | Martino et al. ......... 427/213.35 |
| 5,900,386 A * | 5/1999 | Freund et al. ............. 502/330 |
| 5,977,012 A * | 11/1999 | Kharas et al. ............. 502/326 |
| 6,074,979 A * | 6/2000 | Hagemeyer et al. ....... 502/159 |
| 6,548,440 B1 * | 4/2003 | Pham et al. ................ 502/71 |

* cited by examiner

*Primary Examiner*—Cam N. Nguyen
(74) *Attorney, Agent, or Firm*—Kathryn A. Marra

(57) ABSTRACT

A method for uniformly dispersing noble metal particles on a porous carrier by first mixing an alkoxide product of aluminum or silicon and a noble metal precursor together; then mixing a surfactant into the mixture; then mixing ammonia solution into the mixture to form a hydroxide of aluminum or silicon; then mixing a reducing agent into the mixture to convert the noble metal precursor into noble metal nanoparticles dispersed on the hydroxide; then separating the noble metal nanoparticles and the hydroxide from the mixture before calcining the hydroxide into an oxide of aluminum or silicon.

24 Claims, No Drawings

METHOD FOR MAKING MONODISPERSED NOBLE METAL NANOPARTICLES SUPPORTED ON OXIDE SUBSTRATES

FIELD OF THE INVENTION

The present invention generally relates to a liquid phase preparation method for nanoparticle catalyst and the catalyst prepared. More particularly, it relates to a liquid phase preparation method for nanoparticles of noble metals smaller than 10 nanometers for uniform distribution on a porous oxide carrier and the catalyst prepared.

BACKGROUND OF THE INVENTION

Activated alumina (aluminum oxide) and activated silica (silicon oxide) that have large surface area per unit volume are commonly used catalyst support materials. In conventional catalyst preparation methods, these catalyst support materials are mixed with precursors of the noble metal components by using three general methods, i.e. co-precipitation, deposition or impregnation. The mixtures are then subjected to a drying process to evaporate the solvent. The dry mass obtained is then subjected to a calcination process to convert the salt or hydroxide form of the active component into a metal or metal oxide form (in the case of aluminum oxide) by slowly heating the sample to the decomposition temperature.

A major challenge in preparing noble metal catalysts is in minimizing the amount of relatively expensive noble metals. The noble metal particles must be distributed (or dispersed) on support particles uniformly so that nearly all of the surface is exposed to the materials to be treated.

In the preparation of nanoparticle noble metal catalysts, a key element in the preparation process is to uniformly disperse the nanoparticles on the support substrates or support particles. Liquid phase preparation method for nanoparticles, when compared to the vapor phase preparation method, has numerous advantages such as simplified fabrication equipment, easily controllable noble metal particle structure and particle size. As a result, the liquid phase preparation method is more suitable in the mass fabrication of nanoparticles on support substrates.

In the conventional method for fabricating nanoparticles wherein support metal oxides are mixed with precursors of the noble metal components, it is difficult to obtain nanoparticles smaller than 10 nanometer due to the calcination process required to convert metal hydroxide to metal oxide. However, it is known that when the size of metallic nanoparticle becomes smaller than 10 nm, its catalytic efficiency improves dramatically. This is because of the quantum size effect, which is defined as the electronic properties of a nanoparticle start to change as its diameter approaches the exciton Bohr diameter.

It is therefore an object of the present invention to provide a fabrication method for nanoparticles that does not have the drawbacks or shortcomings of the conventional preparation methods for nanoparticles.

It is another object of the present invention to provide a method for fabricating nanoparticles that are smaller than 10 nanometers in size to be dispersed uniformly over metal oxide or inorganic oxide support particles.

It is a further object of the present invention to provide a method for fabricating nanoparticles of a noble metal catalyst by first converting a noble metal precursor to its metal phase and then supporting noble metal particles on a metal hydroxide prior to conducting a calcination process for converting the metal hydroxide into metal oxide.

It is another further object of the present invention to provide a method for fabricating nanoparticles of a noble metal catalyst that produces smaller sized noble metal particles and improved surface adhesion between the metal particles and the catalyst carrier.

SUMMARY OF THE INVENTION

In accordance with the present invention, a method for uniformly dispersing noble metal particles on a porous carrier and the catalyst produced are provided.

In a preferred embodiment, a method for uniformly dispersing noble metal particles on a porous carrier can be carried out by the operating steps of mixing an alkoxide product of aluminum or silicon and a noble metal precursor together forming a first mixture; then mixing a surfactant into the first mixture forming a second mixture; then mixing ammonia solution into the second mixture forming a hydroxide of aluminum or silicon in a third mixture; then mixing a reducing agent into the third mixture converting the noble metal precursor into noble metal particles each has a particle size not larger than 10 nm dispersed on the hydroxide; then separating the noble metal particles and the hydroxide from the third mixture; and calcining the hydroxide into an oxide of aluminum or silicon.

The method for uniformly dispersing noble metal particles on a porous carrier may further include the step of converting the noble metal precursor into noble metal particles each has a particle size not larger than 10 nm, or the step of washing and drying prior to the calcination step.

The present invention is further directed to a method for uniformly dispersing particles of noble metal on an aluminum oxide carrier which can be carried out by the operating steps of mixing an organoaluminum and a noble metal precursor together forming a first mixture; adding a surfactant into the first mixture forming a second mixture; mixing ammonia solution into the second mixture forming aluminum hydroxide in a third mixture; mixing a reducing agent into the third mixture converting the noble metal precursor into noble metal particles each has a particle size not larger than 10 nm dispersed on the aluminum hydroxide; separating the noble metal particles and the aluminum hydroxide from the third mixture; and calcining the aluminum hydroxide into aluminum oxide.

In the method for uniformly dispersing noble metal particles on aluminum oxide, the first mixture may contain between 25 mmol/l and 450 mmol/l of the organoaluminum. The organoaluminum may be selected from the group consisting of aluminum ethoxide, aluminum isopropoxide, aluminum sec-butoxide, aluminum tert-butoxide and aluminum isobutoxide. The method may further include the step of forming the noble metal precursor by desolving a noble metal compound in water or in an organic solvent. The organic solvent may be selected from the group consisting of ethanol, cyclohexane, n-hexane, chloroform and acetone. The noble metal particles may be selected from the group consisting of gold, silver, copper, cobalt, nickel and platinum. The ammonia solution may be a 3~10 weight % ammonia solution. The second mixture may contain the surfactant at a molar ratio with aluminum between 1:1 and 1:10. The third-mixture may contain the reducing agent at a molar ratio with the noble metal between 5:1 and 20:1.

In the method for uniformly dispersing noble metal particles on aluminum oxide, the surfactant may be a non-ionic surfactant selected from the group consisting of polyglycol and polyethylene glycols of polyoxyethylene alkyl phenol ether, polypropylene glycol/polyethanol reaction product, fatty alcohol-polyoxyethylene ethers and fatty acid-polyoxyethylene. The surfactant may be a cationic surfactant selected from the group consisting of cetyltrimethyl ammonium bromide (CTAB), cetyltrimethyl ammonium chloride (CTAC) and $C_{10}$–$C_{20}$ long-chain alkyl ammonium. The reducing agent may be selected from the group consisting of hydrazine, hydrazine sulfate and boron hydride.

The present invention is still further directed to a method for uniformly dispersing particles of noble metal on a silicon oxide carrier which can be carried out by the operating steps of mixing silane oxide and a noble metal precursor forming a first mixture; mixing ethanol, ammonia solution and a surfactant forming a second mixture; mixing by adding the first mixture into the second mixture forming silicon hydroxide gel in a third mixture; adding a reducing agent into the third mixture converting the noble metal precursor into noble metal particles each has a particle size not larger than 10 nm dispersed on the silicon hydroxide; separating the noble metal particles and the silicon hydroxide from the third mixture; and calcining the silicon hydroxide into silicon oxide.

The present invention method for uniformly dispersing particles of noble metal on a silicon oxide carrier may further include the step of forming the noble metal precursor by desolving a noble metal compound in water or in an organic solvent. The first and second mixture may contain silane oxide, ethanol, ammonia solution and surfactant at a molar ratio of 1:40~100:0.5~2:0.5~5. The molar ratio of the reducing agent and the noble metal added to the third mixture is between 5:1 and 20:1. The silane oxide may be selected from the group consisting of ethyl orthosilicate ($C_4$–$C_{16}$ silicate ester), methyl orthosilicate, propyl orthosilicate and butyl orthosilicate. The organic solvent may be selected from the group consisting of ethanol, cyclohexane, n-hexane, chloroform and acetone. The noble metal particles may be selected from the group consisting of gold, silver, copper, cobalt, nickel and platinum. The ammonia solution may be a 3~10 wt. % ammonia solution. The surfactant may be a non-ionic surface agent selected from the group consisting of polyglycol and polyethylene glycols of polyoxyethylene alkyl phenol ether, polypropylene glycol/polyethanol reaction product, fatty alcohol-polyoxyethylene ethers and fatty acid-polyoxyethylene. The surfactant may be a cationic surface active agent selected from the group consisting of cetyltrimethyl ammonium bromide (CTAB), cetyltrimethyl ammonium chloride (CTAC) and $C_{10}$–$C_{20}$ long-chain alkyl ammonium. The reducing agent may be selected from the group consisting of hydrazine, hydrazine sulfate and boron hydride.

The present invention is still further directed to a carrier of noble metal particles which includes a carrier of a porous body that has a BET (Brunauer, Emmett & Teller) surface area of at least 100 m$^2$/g; and noble metal particles that have sizes smaller than 10 nm dispersed on the porous body. The porous body may be formed of a material selected from the group consisting of aluminum oxide and silicon oxide. The noble metal particles are formed of a material selected from the group consisting of gold, silver, copper, cobalt, nickel and platinum.

DETAILED DESCRIPTION OF THE PREFERRED AND ALTERNATE EMBODIMENTS

The present invention discloses a method for uniformly dispersing noble metal particles on a porous carrier and the catalyst formed by the method.

In a preferred embodiment, a method for uniformly dispersing particles of noble metal on an aluminum oxide carrier is disclosed. While in an alternate embodiment, a method for uniformly dispersing particles of noble metal on a silicon oxide carrier is disclosed. The present invention provides a unique method for preparing a noble metal catalyst of nanoparticles less than 10 nm in size, and preferably less than 5 nm in size, dispersed uniformly over aluminum oxide or silicon oxide support particles. A major difference in the present invention method when compared to conventional methods is the processing technique. In the present invention method, a noble metal precursor, e.g., a noble metal salt is reduced to its metal phase and supported on aluminum hydroxide or silicon hydroxide prior to a calcination step. Two of the advantages achieved by the present invention method are substantially smaller noble metal particles, i.e. less than 10 nm, and preferably less than 5 nm, and improved surface adhesion between the metal particles and the catalyst carrier are obtained.

The catalyst prepared by the present invention method produces uniformly dispersed noble metal particles, or nanoparticles at less than 10 nm size, and preferable at less than 5 nm size. The smaller nanoparticle size results in a higher catalytic surface area per unit volume, an improved catalytic conversion efficiency, and reduced noble metal usage.

In the preferred embodiment, samples of 1%~3% platinum supported on aluminum oxide are prepared. The transmission electron microscope pictures showed a uniform dispersion of platinum particles over aluminum oxide support. The average platinum particle size prepared using the present invention method is between 2 nm and 10 nm. CO pulse chemisorption was conducted to measure the active surface area as well as the size of the noble metal particles prepared in the preferred embodiment. In this test, known volumes of CO gas were introduced to the sample and adsorbed by the active Pt sites on the alumina support. By measuring the volume of CO adsorbed, the active metal surface area, or metal dispersion, of the catalyst can be determined. The actual sizes of noble metal particles were determined based on the active surface area or metal dispersion measured. The results from CO chemisorption are consistent with the microscopic results which is an indication that all the particles shown in the microscopic pictures are active particles.

In the preferred embodiment where aluminum oxide is used as the catalyst carrier, the process can be carried out by the operating steps of: 1) Mix organoaluminum and noble metal precursor in water or organic solvent. The amount of organoaluminum is controlled in a range of 25 mmol/l to 450 mmol/l in the mixture. The amount of noble metal precursor is calculated based on the weight % of noble metal targeted in the formulation of the final product. The pH of the solution is adjusted to 2 with HCl; 2) Add template agent (or surfactant) to the above mixture. The molar ratio of template to aluminum is controlled in the range of 1:1 to 1:10. The purpose of adding template is to create the desired pore structure; 3) Add 3–10 wt. % ammonia solution to the above mixture. In this step, organoaluminum is converted to its hydroxide form through hydrolysis reaction; 4) Add reducing agent to the above mixture to convert the noble metal precursor to its metal form. The noble metal is uniformly dispersed over aluminum hydroxide; and 5) Separate noble metal and aluminum hydroxide from the liquid. Washing, drying, and calcination are performed after the separation step to convert aluminum hydroxide into its oxide form. The template used in step 2 is also decomposed in the calcination step to create the desired pore structure and surface area over the aluminum oxide.

In an alternate embodiment, silane oxide is used instead of the organoaluminum to form silicon hydroxide as a carrier for the nanoparticles of the noble metal. The silicon hydroxide is then calcined to form silicon oxide as the final catalyst carrier.

Detailed processing steps for the preferred embodiment method may be described as follows. The organoaluminum (or organic aluminum alkoxide) solution is mixed with the noble metal precursor solution to form a uniform, transparent mixture. The mixture contains between 25 mmol/l and 450 mmol/l organoaluminum. The weight % ratio of the noble metal to the aluminum oxide contained in the organoaluminum is between 0.5% and 5%. The noble metal precursor solution is formed by a noble metal compound and water or organic solvent. The noble metal may be selected from the salt of a transition element such as gold, silver, copper, cobalt, nickel or platinum. The organic solvent for forming the noble metal precursor may be ethanol, cyclohexane, n-hexane, chloroform or acetone. The organoaluminum may be selected from aluminum ethoxide, aluminum isopropoxide, aluminum sec-butoxide, aluminum tert-butoxide or aluminum isobutoxide.

In the next step of the process, a surfactant is added to the solution mixture of the organoaluminum and the noble metal precursor to a molar ratio of surfactant:aluminum between 1:1 and 1:10. The organoaluminum is completely hydrolyzed to obtain aluminum hydroxide by adding ammonia solution into above mixture. The surfactant acts as a templating agent in the matrix to create the desired pore structure in the final product. The desired BET surface area of a carrier of noble metal particles is at least 100 m$^2$/g, and preferably at least 300 m$^2$/g. A reducing agent is then added into the mixture to reduce the noble metal precursor into nanoparticles of the noble metal for dispersing over the aluminum hydroxide. A molar ratio of the reducing agent and the noble metal is between 5:1 and 20:1. In the hydrolysis process, ammonia solution of 3~10 wt. % concentration may be used to convert the organoaluminum to aluminum hydroxide. A molar ratio of the organoaluminum to water in the organoaluminum solution is between 1:0.5 and 1:5. A suitable organo-alcohol for forming the organoaluminum is ethanol, isopropanol, sec-butyl alcohol, tert-butyl alcohol and isobutanol.

In the final step of the preferred embodiment process, the nanoparticles of the noble metal obtained from the previous process step is separated, dried and calcined to obtain nanoparticles of the noble metal dispersed on a porous aluminum oxide carrier wherein the nanoparticles have a diameter smaller than 10 nanometer, and preferably smaller than 5 nanometer.

In the alternate embodiment wherein silane oxide is used as the silicon source for forming silicon oxide carrier, a mixture is first formed of ethanol, ammonia solution and a surfactant in a homogeneous, transparent solution. A mixture of silane oxide and noble metal precursor is then slowly flown into the homogeneous, transparent mixture and stirred to achieve total hydrolysis. In the final mixture, the molar ratio of the silane oxide:ethanol:ammonia solution:surfactant is 1:40~100:0.5~2:0.5~5. A weight percentage ratio of the noble metal to the silicon oxide content in the silane oxide is between 0.5% and 5%. After the hydrolysis process is completed and the reaction is allowed to proceed for several tens of hours, a reducing agent is added into the solution such that a molar ratio between the reducing agent and the noble metal is between 5:1 and 20:1.

In the next step of the process, the nanoparticles of the noble metal is separated, dried and calcined for uniform distribution on top of the porous silicon oxide carrier substrate. The nanoparticles of the noble metal have a diameter under 10 nanometers, and preferably under 5 nanometers.

The silane oxide used includes ethyl orthosilicate (or $C_4$–$C_{16}$ silicate ester). The surfactant used includes non-ionic type surfactant and cationic type surfactant. The non-ionic type surfactant includes polyglycol, polyglycol group and polyethylene group. The polyglycol group surfactant includes polyoxyethylene alkyl phenol ether, polypropolyne glycol, polyethanol, fatty alcohol-polyoxyethylene ether, and fatty acid-polyoxyethylene. The cationic surfactant may include cetyltrimethyl ammonium bromide (CTAB), cetyltrimethyl ammonium chloride (CTAC) and $C_{10}$–$C_{20}$ long-chain alkyl ammonium. The reducing agent utilized may be hydrazine, hydrazine sulfate or boron hydride.

IMPLEMENTATION EXAMPLES

Implementation Example 1

In this example, aluminum isopropoxide is used as the supply for aluminum to form Pt/$Al_2O_3$ catalyst. The precursor solution mainly contains aluminum isopropyloxide, polyoxyethylene alkyl phenol ether and chloroplatinic acid. The solution contains polyoxyethylene alkyl phenol ether and aluminum at a molar ratio between 1:10 and 1:1. The amount of chloroplatinic acid used is such that the weight ratio of Pt/$Al_2O_3$ is 0.5%, 1%, 2% and 3%, respectively. 3 grams of aluminum isopropyloxide is dissolved in 120 ml anhydrous ethanol and the pH is adjusted to 2 by HCl. 5 ml of polyoxyethylene alkyl phenol ether and 3 ml chloroplatinic acid (0.0337 mol/L) water solution are then added to above solution to form an homogeneous, transparent mixture. After thoroughly stirred, 14 ml of ammonia solution (3 wt. %) is then slowly added into the above mixture. The aluminum isopropoxide is hydrolyzed slowly in the mixture while controlling pH at 4.7. After the mixing is completed, a light yellow colored aluminum hydroxide gel is obtained. The reaction is allowed to continue for 3 hours and then 6 ml of sodium borohydride ($NaBH_4$) water solution (0.3 mol/L) is added to carry out a reduction reaction. A dark brown colored aluminum hydroxide gel is obtained and allowed to further react for 2 hours. Finally, the product is allowed to age at room temperature for 10 hours and then vacuum filtered. At this point, the platinum complex ions in the chloroplatinic acid is completely, uniformly distributed in the aluminum hydroxide gel and reduced to noble metal nanoparticles by sodium borohydride. The filtered product does not contain any platinum complex ions. The excess reducing agent is washed by distilled water 3~4 times and then washed by anhydrous ethanol 2~3 times to obtain a product gel which can be dried, calcined such that gel may be redistributed in the anhydrous ethanol. A turbine spray mist dryer is used to dry the product at 100° C. for 2 hours, and then calcined at 500° C. for 5 hours to obtain platinum nanoparticles of smaller than 5 nm on a porous aluminum oxide carrier substrate.

Implementation Example 2

In this example, 3 grams of aluminum isopropyloxide is first dissolved in anhydrous ethanol. The pH is adjusted to 2 by HCl. 10 ml of a non-ionic surfactant polyglycol octyl phenyl ether is then added to the solution. 4 ml of a water solution of chlorauric acid which has a concentration of 0.04 mol/L is then added. After thorough mixing, a homogeneous, transparent light yellow colored AIP (aluminum isopropoxide), chlorauric acid and surfactant mixture is obtained. By slowly adding 15 ml 3 wt. % of ammonia water solution into above mixture, aluminum isopropoxide is hydrolyzed completely to obtain a light yellow colored, thick aluminum hydroxide gel. The reaction is allowed to continue for 3 hours. 6 ml of 0.3 mol/L of $NaBH_4$ water solution is then added for a reduction process to obtain a homogeneous, purple colored aluminum hydroxide gel. Continuing the reaction for two more hours and aged at high temperature for 10 hours. After filtering, washing, drying and calcining, $Au/Al_2O_3$ catalyst is obtained.

Implementation Example 3

In this example, aluminum sec-butoxide is used as aluminum precursor to form $Pt/Al_2O_3$ catalyst. Since aluminum sec-butoxide easily absorbs moisture and hydrolyzes, there are two methods for preparing a solution of aluminum sec-butoxide. The first method is to dissolve aluminum sec-butoxide directly in sec-butyl alcohol; the other method is to dissolve aluminum sec-butoxide in cyclohexane, while chloroplatinic acid is dissolved in an acetone solvent. 7.4 grams of aluminum sec-butoxide is weighed and dissolved in 60 ml sec-butyl alcohol. 2 ml (0.04 mol/L) of an acetone solution of choloroplatinic acid is mixed with 10 ml OP (polyoxyethylene alkylphenyl ether) to form a uniform, transparent ATB aluminum tert-butoxide), chloroplatinic acid and OP mixture solution. A hydrolyst solution (15 ml sec-butyl alcohol and 1.5 ml water) is then used to conduct a hydrolysis reaction. After the hydrolysis reaction is continued for 3 hours, 15 ml (0.3 mol/L) of a water solution of sodium borohydride is added for a reduction process. After the solution is continuously stirred for 3 hours, a dark brown aluminum hydroxide gel is obtained. After aged for 24 hours at room temperature, a product that is similar to that obtained in the previous two implementation examples is obtained.

Implementation Example 4

In this example, a fixed amount of aluminum sec-butoxide is first dissolved in cyclohexane to form a transparent solution of ATB. A small amount of surfactant is then added and continuously stirred while measured amount of an acetone solution of chloroplatinic acid is added. A pre-mixed hydrolyst solution (surfactant+anhydrous ethanol+water to control the reaction at a ratio of surfactant:Al:water=1:2:4 or 1:10:100) to slowly hydrolyze the solution.

8.1 gram of ATB is then dissolved in 8 ml cyclohexane. 0.6 ml of a non-ionic surfactant of OP is then added to form a homogeneous, transparent solution. 2.5 ml of an acetone solution of chloroplatinic acid (at a concentration of 0.07 mol/L) is then slowly added into the solution and after sufficiently stirred, to obtain a light yellow colored, transparent mixture. A pre-mixed hydrolyst solution (which contains 10 ml OP+15 ml anhydrous ethanol+1.5 ml water) is used to conduct the hydrolysis reaction. 20 ml of anhydrous ethanol is used to dilute the solution and allowed to react for 3 hours. 40 ml of anhydrous ethanol is then used to dilute the solution. 0.3 mol/L water solution of $NaBH_4$ is then used for the reduction process to obtain a dark brown colored aluminum hydroxide gel. The reaction is allowed to continue for 3 hours and then aged at room temperature for 24 hours. The process steps that follows are similar to those in the previous implementation examples.

Implementation Example 5

In this example, 3 grams of aluminum isopropoxide is first dissolved in 120 ml anhydrous ethanol. The pH is adjusted to 2 by HCl. 5 ml of a surfactant of OP and 0.6 ml of a water solution of 0.5 mol/L copper sulfate are added to the solution to obtain a light green colored, transparent mixture. A 3.3 wt % ammonia water is used for the hydrolysis reaction, i.e. by adding 5 ml to obtain a sky blue colored aluminum hydroxide gel. In order to thoroughly hydrolyze, 7 ml of a hydrolyst solution is added. The reaction is continued for 3 hours and then aged at room temperature for 12 hours. After vacuum filtering, washing, spray mist drying, a powder is obtained. After drying for 2 hours at 100° C. and calcining for 7 hours at 600° C., a $CuO/Al_2O_3$ solid catalyst is obtained.

Implementation Example 6

In this example, 4 grams of aluminum isopropoxide is first dissolved in 160 ml anhydrous ethanol. The pH value is adjusted to 2 by HCl. 10 ml of a non-ionic surfactant of $TMN_{10}$ (Tergitol® supplied by Fluka Corp. grade 8645) and 1 ml of a water solution of palladium chloride ($PdCl_2$) of 0.1 mol/L are mixed to form a homogeneous, transparent mixture. A 3.3 wt % ammonia solution is used for the hydrolysis reaction. After the completion of the hydrolysis reaction, the reaction is continued for 3 hours, before 3 ml of a reducing agent of $H_4N_2.H_2O$ is added for the reduction process. The Pd atoms are uniformly distributed on the aluminum hydroxide gel. The gel is then aged at room temperature for 12 hours and dried as previously described to obtained $Pd/Al_2O_3$ solid catalyst.

Implementation Example 7

In this example, ethyl orthosilicate is used to prepare $Pt/SiO_2$ solid catalyst. 150 ml of ethanol is first added into 15 ml ammonia solution (28 wt %) and then uniformly mixed together. 6 grams of a surfact of Pluronic® F127 (supplied by Sigma Cor. Grade 2443) is then added and continuously stirred. A solution mixture of 10 ml of ethyl orthosilicate and 3 ml (0.05 mol/L) of acetone chloroplatinate is slowly added to the first mixture. After the completion of the hydrolysis reaction, the reaction is allowed to continue for 4 hours. 6 ml of $NaBH_4$ (0.3 mol/L) is then added to conduct a reduction process and to obtain a dark brown colored platinum/silicon dioxide suspension. After separation by ultra centrifuge, washing, drying at 100° C. for 1 hour, calcining at 300° C. for 3 hours, $Pt/SiO_2$ catalyst is obtained.

While the present invention has been described in an illustrative manner, it should be understood that the terminology used is intended to be in a nature of words of description rather than of limitation.

Furthermore, while the present invention has been described in terms of one preferred and one alternate embodiment, it is to be appreciated that those skilled in the art will readily apply these teachings to other possible variations of the inventions.

The embodiment of the invention in which an exclusive property or privilege is claimed are defined as follows.

What is claimed is:

1. A method for uniformly dispersing noble metal particles on a porous carrier comprising the sequential steps of:
mixing an oxidation product of aluminum or silicon and a noble metal precursor forming a first mixture; mixing a surfactant into said first mixture forming a second mixture;
mixing ammonia solution into said second mixture forming a third mixture containing a hydroxide of aluminum or silicon;
mixing a reducing agent into said third mixture converting said noble metal precursor into noble metal particles each having a particle size not larger than 10 nm dispersed on said hydroxide;
separating said noble metal particles and said hydroxide from said third mixture; and
calcining said hydroxide into an oxide of aluminum or silicon.

2. A method for uniformly dispersing noble metal particles on a porous carrier according to claim 1 further comprising the step of converting into said noble metal particles each having a particle size not larger than 5 nm.

3. A method for uniformly dispersing noble metal particles on a porous carrier according to claim 1 further comprising the step of washing and drying prior to said calcining step.

4. A method for uniformly dispersing particles of noble metal on an aluminum oxide carrier comprising the sequential steps of:
mixing an organoaluminum and a noble metal precursor forming a first mixture;
adding a surfactant into said first mixture forming a second mixture;
mixing ammonia solution into said second mixture forming a third mixture containing aluminum hydroxide;
mixing a reducing agent into said third mixture converting said noble metal precursor into noble metal particles each having a particle size not larger than 10 nm dispersed on said aluminum hydroxide;
separating said noble metal particles and said aluminum hydroxide from said second mixture;
calcining said aluminum hydroxide into aluminum oxide; and
wherein said first mixture contains between 25 mmol/l and 450 mmol/l of said organoaluminum.

5. A method for uniformly dispersing noble metal particles on aluminum oxide according to claim 4, wherein said organoaluminum is selected from the group consisting of aluminum ethoxide, aluminum isopropoxide, aluminum sec-butoxide, aluminum tert-butoxide and aluminum isobutoxide.

6. A method for uniformly dispersing noble metal particles on aluminum oxide according to claim 4 further comprising the step of forming said noble metal precursor by dissolving a noble metal compound in water or an organic solvent.

7. A method for uniformly dispersing noble metal particles on aluminum oxide according to claim 6, wherein said organic solvent is selected from the group consisting of ethanol, cyclohexane, n-hexane, chloroform and acetone.

8. A method for uniformly dispersing noble metal particles on aluminum oxide according to claim 4, wherein said noble metal particles are selected from the group consisting of gold, silver, copper, cobalt, nickel and platinum.

9. A method for uniformly dispersing noble metal particles on aluminum oxide according to claim 4, wherein said ammonia solution is a 3–10 wt. % ammonia solution.

10. A method for uniformly dispersing noble metal particles on aluminum oxide according to claim 4, wherein said second mixture containing said surfactant at a molar ratio with aluminum between 1:1 and 1:10.

11. A method for uniformly dispersing noble metal particles on aluminum oxide according to claim 4, wherein said second mixture containing said reducing agent at a molar ratio with said noble metal between 5:1 and 20:1.

12. A method for uniformly dispersing noble metal particles on aluminum oxide according to claim 4, wherein said surfactantis a non-iomc surfactant selected from the group consisting of polyglycol and polyethylene glycols of polyoxyethylene alkyl phenol ether, polypropylene glycol/polyethanol reactant product, fatty alcohol-polyoxyethylene ethers and fatty acid-polyoxyethylene.

13. A method for uniformly dispersing noble metal particles on aluminum oxide according to claim 12, wherein said surfactant is a non-ionic surfactant selected from the group consisting of polyglycol and polyethylene glycols of polyoxyethylene alkyl phenol ether, polypropylene glycol/polyethanol reactant product, fatty alcohol-polyoxyethylene ethers and fatty acid-polyoxyethylene.

14. A method for uniformly dispersing noble metal particles on aluminum oxide according to claim 4, wherein said surfactant is a cationic surfactant selected from the group consisting of cetyltrimethyl ammonium bromide (CTAB), cetyltrimethyl ammonium chloride (CTAC) and $C_{10}$–$C_{20}$ long-chain alkyl ammonium.

15. A method for uniformly dispersing noble metal particles on aluminum oxide according to claim 4, wherein said reducing agent is selected from the group consisting of hydrazine, hydrazine sulfate and boron hydride.

16. A method for uniformly dispersing particles of noble metal on a silicon oxide carrier comprising the sequential steps of:
mixing silane oxide and a noble metal precursor forming a first mixture;
mixing ethanol, ammonia solution and a surfactant forming a second mixture;
mixing by adding said first mixture into said second mixture forming a silicon hydroxide gel in a third mixture;
adding a reducing agent into said third mixture converting said noble metal precursor into noble metal particles each having a particle size not larger than 10 nm dispersed on said silicon hydroxide;
separating said noble metal particles and said silicon hydroxide from said third mixture;
calcining said silicon hydroxide into silicon oxide; and
wherein said third mixture contains silane oxide, ethanol, ammonia solution and surfactant at a molar ratio of 1:40–100:0.5–2:0.5–5.

17. A method for uniformly dispersing particles of noble metal on a silicon oxide carrier according to claim 16 further comprising the step of forming said noble metal precursor by dissolving a noble metal compound in water or an organic solvent.

18. A method for uniformly dispersing noble metal particles on aluminum oxide according to claim 17, wherein said organic solvent is selected from the group consisting of ethanol, cyclohexane, n-hexane, chloroform and acetone.

19. A method for uniformly dispersing particles of noble metal on a silicon oxide carrier according to claim 16 wherein said third mixture containing said reducing agent at a molar ratio with said noble metal between 5:1 and 20:1.

20. A method for uniformly dispersing particles of noble metal on a silicon oxide carrier according to claim 16 wherein said silane oxide is selected from the group consisting of ethyl orthosilicate ($C_4$–$C_{16}$ silicate ester), methyl orthosilicate, propyl orthosilicate and butyl orthosilicate.

21. A method for uniformly dispersing noble metal particles on aluminum oxide according to claim 16, wherein said noble metal particles are selected from the group consisting of gold, silver, copper, cobalt, nickel and platinum.

22. A method for uniformly dispersing noble metal particles on aluminum oxide according to claim 16, wherein said ammonia solution is a 3–10 wt. % ammonia solution.

23. A method for uniformly dispersing noble metal particles on aluminum oxide according to claim 16, wherein said surfactant is a cationic surfactant selected from the group consisting of cetyltrimethyl ammonium bromide (CTAB), cetyltrimethyl amnionium chloride (CTAC) and $C_{10}$–$C_{20}$ long-chain alkyl ammonium.

24. A method for uniformly dispersing noble metal particles on aluminum oxide according to claim 16, wherein said reducing agent is selected from the group consisting of hydrazine, hydrazine sulfate and boron hydride.

\* \* \* \* \*